(12) United States Patent
Kimura

(10) Patent No.: US 7,085,086 B2
(45) Date of Patent: Aug. 1, 2006

(54) APPARATUS AND METHOD FOR REDUCING ERRORS IN WRITING TO A STORAGE MEDIUM

(75) Inventor: Tomoaki Kimura, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 10/827,031

(22) Filed: Apr. 19, 2004

(65) Prior Publication Data

US 2004/0264022 A1   Dec. 30, 2004

(30) Foreign Application Priority Data

Apr. 17, 2003   (JP) .............................. 2003-113393

(51) Int. Cl.
*G11B 27/36* (2006.01)
*G11B 5/09* (2006.01)

(52) U.S. Cl. .......................................... 360/53; 360/31
(58) Field of Classification Search ...................... None
See application file for complete search history.

(56) References Cited

U.S. PATENT DOCUMENTS

| | | | |
|---|---|---|---|
| 5,394,280 A * | 2/1995 | Chliwnyj et al. | 360/77.12 |
| 6,229,661 B1 * | 5/2001 | Abe | 360/53 |
| 6,381,706 B1 * | 4/2002 | Zaczek | 714/5 |
| 6,384,999 B1 * | 5/2002 | Schibilla | 360/53 |
| 6,445,524 B1 * | 9/2002 | Nazarian et al. | 360/49 |
| 6,469,854 B1 * | 10/2002 | Gill et al. | 360/53 |
| 6,769,088 B1 * | 7/2004 | Weng | 714/766 |

* cited by examiner

*Primary Examiner*—Wayne Young
*Assistant Examiner*—Varsha A. Kapadia
(74) *Attorney, Agent, or Firm*—Jean M. Barkley; Dillon & Yudell LLP

(57) ABSTRACT

A storage apparatus for sequentially writing a plurality of blocks of data generated by dividing data on a data recording medium, the storage apparatus including: a sequential writing unit for sequentially associating and writing each of the plurality of blocks with validity information indicating whether or not data contained in the block is valid, on the data recording medium; an error detecting unit for detecting that writing of a single block causes the validity information of the single block to be written in an error area that generates a write error on the data recording medium; a write-area changing unit for changing a write-area in which an additional block is written to cause the additional block written before the single block, excluding the validity information of the additional block, to be written in the error area and the validity information of the additional information to be written in an area other than the error area; and an error circumventing unit for writing the single block in a write-area on the data recording medium, the write-area following the error area.

19 Claims, 6 Drawing Sheets

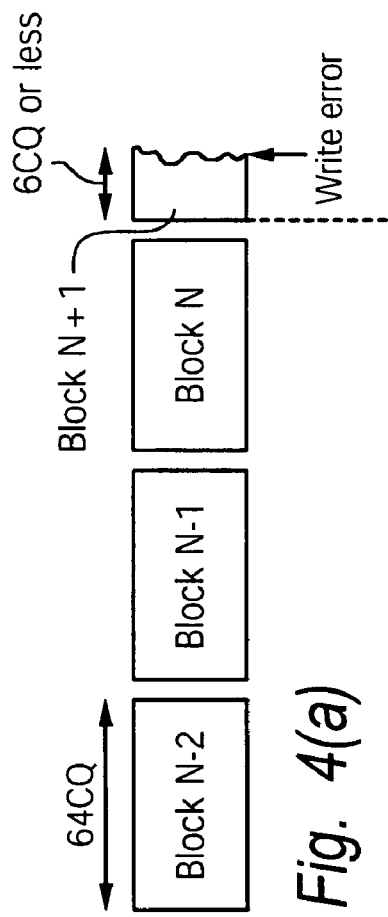
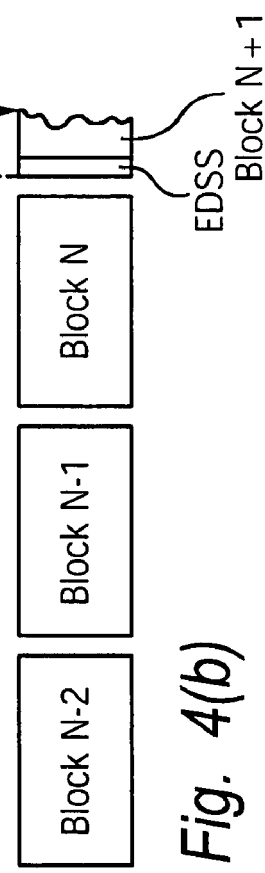
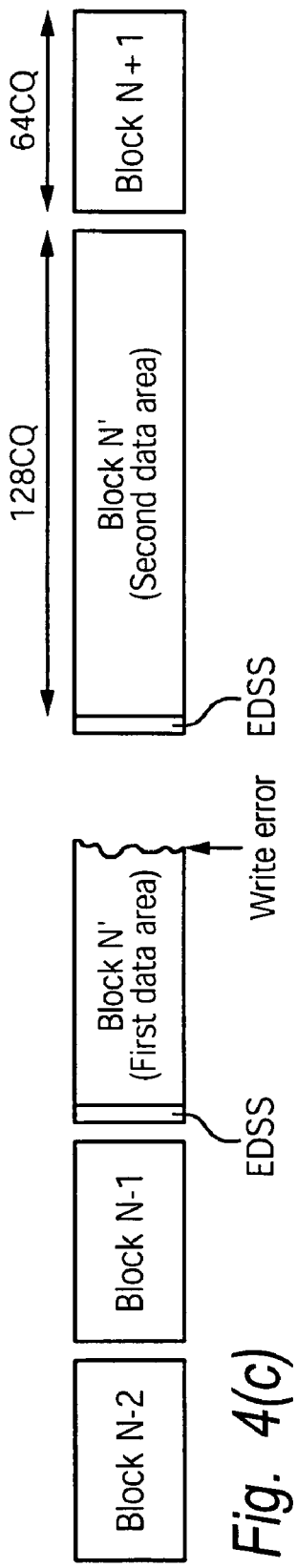
Fig. 4(a)
Fig. 4(b)
Fig. 4(c)

APPARATUS AND METHOD FOR REDUCING ERRORS IN WRITING TO A STORAGE MEDIUM

PRIORITY CLAIM

This application claims priority of Japanese Patent Application No. 2003-113393, filed on Apr. 17, 2003, and entitled, "Storage Apparatus, Control Method, Program, Program Recording Medium, and Data Recording Medium."

BACKGROUND OF THE INVENTION

1. Technical Field

The present invention relates to a memory device, control method, program, program recording medium, and data recording medium and in particular to a memory device, control, method, program, program recording medium, and data recording medium that avoid an error in writing data.

2. Description of the Related Art

If a write error occurs in a block on a conventional tape recording medium, in a tape drive conforming to the LTO (Linear Tape Open) standard, the tape drive can skip the error area on the tape recording medium in which the write error occurred and rewrite the block into an area following the error area. In that case, the drive can read data from the block in which the error has occurred to determine whether the block is invalid. Please refer to LTO standard written by Hewlett-Packard Corporation, International Business Machines Corporation, and Seagate Technologies Corporation.

However, if a write error occurs before information indicating whether or not a block is valid is written, if, for example, a write error occurs before required information of a predetermined length, required for determining whether a block is valid or not, is written, the device described above cannot properly record whether the written block is valid. Consequently, the error area and the subsequent areas on the tape recording medium may become unusable.

Therefore, an object of the present invention is to provide a memory apparatus, control method, program, programs recording medium, and data recording medium that can solve the problem. The object is achieved by the combination of features set forth in the independent claims herein. The dependent claims define preferable, specific embodiments of the present invention.

SUMMARY OF THE INVENTION

According to a first aspect of the present invention, there is provided a memory apparatus that sequentially writes a plurality of blocks, generated by dividing data onto a data recording medium for recording data, a control method and program for controlling the memory apparatus, a program recording medium on which the program is recorded, and a data recording medium generated by the memory apparatus, the memory apparatus comprising: a sequential writing unit for sequentially associating and writing each of the plurality of blocks with validity information indicating whether or not data contained in the block is valid; an error detecting unit for detecting that writing of a single block by the sequential writing unit causes the validity information of the single block to be written in an error area that generates a write error on the data recording medium; a write-area changing unit for changing a write-area on the data recording medium in which an additional block is written to cause the additional block written before the single block, excluding the validity information of the additional block, to be written in the error area and the validity information of the additional block to be written in an area other than the error area; and an error circumventing unit for writing the single block in a write-area on the data recording medium, the write-area following the error area.

According to the embodiments described below, a storage apparatus, control method, program, program recording medium, and data recording medium described under the following items can be implemented.

A storage apparatus for sequentially writing a plurality of blocks of data generated by dividing data on a data recording medium for recording data comprises a sequential writing unit for sequentially associating and writing each of the plurality of blocks with validity information indicating whether or not data contained in the block is valid, on the data recording medium; an error detecting unit for detecting that writing of a single block by the sequential writing unit causes the validity information of the single block to be written in an error area that generates a write error on the data recording medium; write-area changing unit for changing a write-area on the data recording medium in which an additional block is written to cause the additional block written before the single block, excluding the validity information of the additional block, to be written in the error area and the validity information of the additional information to be written in an area other than the error area; and an error circumventing unit for writing the single block in a write-area on the data recording medium, the write-area following the error area.

The storage apparatus described above, further comprises an error detector, wherein the error detecting unit detects that the writing of the single block has caused the validity information of the single block to be written in the error area; and if the write error is detected, the write-area changing unit changes the write-area of the additional block by rewriting the additional block in an area different from the area in which the sequential writing unit has written the additional block before writing the single block.

The storage apparatus described above, further comprises a write-area changing unit wherein the write-area changing unit changes the write-area of the additional block by writing as the additional block a block including data in the additional block and having a size larger than the additional block, in place of the additional block written by the sequential writing unit.

The storage apparatus described above further comprises a write-area changing unit wherein the write-area changing unit writes the block having a size larger than the additional block written by the sequential writing unit by redundantly writing at least part of the data contained in the additional block written by the sequential writing unit.

The storage apparatus described above further comprises a write-area changing unit, wherein the write-area changing unit reads data contained in the additional block written by the sequential writing unit from the data recording medium and rewrites the data in the changed write-area.

The storage apparatus described above, further comprises a rewriting unit for changing the position at which to start writing of the single block on the data recording medium and rewriting the single block onto the data recording medium, if the validity information of the single block is written in the error area by the sequential writing unit; wherein the error detecting unit detects that the validity information is written in the error area if the validity information is written in the error area after the rewriting unit changes the position at which to start writing the single block.

The storage apparatus described above further comprises an error detecting unit, wherein the error detecting unit detects that the validity information of the single block that is to be recorded contiguously to the additional block is written in the error area; and the write-area changing unit changes the write-area of the additional block by writing as the additional block a block including data in the additional block and having a size larger than the additional block in place of the additional block written by the sequential writing unit.

The storage apparatus described above, includes means for the validity information of each of the plurality of blocks to be written in a storage area having a predetermined length from the beginning of the block; the error detecting unit detects that the validity information of the single block is written in the error area if the write error occurs in writing the predetermined length of the single block from the beginning of the single block; and the write-area changing unit changes the write-area of the additional block to prevent the predetermined length of part of the additional block from the beginning of the additional block from being written in the error area and cause a part of the additional block that follows the part of the predetermined length to be written in the error area.

The storage apparatus described above further comprises an error-detecting unit, wherein the error detecting unit detects that the validity information of the single block that is to be recorded contiguously to the additional block is written in the error area; and the write-area changing unit writes a block fragment that is a part of the additional block into an area in which the additional block is written by the sequential writing unit and writes the additional block contiguously to the block fragment to change the write-area of the additional block to cause the additional block, excluding the validity information of the additional block, to be written in the error area.

The data storage apparatus described above further comprises means for each of the plurality of blocks to further include a data recency indicator indicating the recency of data to be newly written with respect to data already written; and the write-area changing unit associates and writes a data recency indicator higher than the data recency indicator of the block fragment written by the write-area changing unit with the additional block to be written in an area that follows the error area.

A control method for using a computer to control a storage apparatus sequentially writing a plurality of blocks of data generated by dividing data on a data recording medium for recording data, the control method comprises a sequential writing step of sequentially associating and writing each of the plurality of blocks with validity information indicating whether or not data contained in the block is valid on the data recording medium; an error detecting step of detecting that writing of a single block by the sequential writing unit causes the validity information of the single block to be written in an error area that generates a write error on the data recording medium; a write-area changing step of changing a write-area on the data recording medium in which an additional block is written to cause the additional block written before the single block, excluding the validity information of the additional block, to be written in the error area and the validity information of the additional information to be written in an area other than the error area; and an error circumventing step of writing the single block in a write-area on the data recording medium, the write-area following the error area.

A program for causing a computer to function as a storage apparatus sequentially writing a plurality of blocks of data generated by dividing data on a data recording medium for recording data, the program causing the computer to function comprises a sequential writing unit for sequentially associating and writing each of the plurality of blocks with validity information indicating whether or not data contained in the block is valid, on the data recording medium; an error detecting unit for detecting that writing of a single block by the sequential writing unit causes the validity information of the single block to be written in an error area causing a write error on the data recording medium; a write-area changing unit for changing a write-area on ~he data recording medium in which an additional block is written to cause an additional block written before the single block, excluding the Validity information of the additional block, to be written in the error area and the validity information of the additional information to be written in an area other than the error area; and an error circumventing unit for writing the single block in a write-area on the data recording medium that follow the error area.

A program recording medium on which the program described above is recorded comprises a computer readable medium and instructions on the computer readable medium for performing each of the steps described above.

A data recording medium on which data is sequentially recorded as a plurality of blocks, wherein, each of the plurality of blocks includes validity information indicating whether or not data contained in the block is valid, comprises a first data separator area in which data rewriting information indicating that data has been rewritten after a write error occurred is recorded; a first data area that is contiguous to the first data separator area and includes an error area generating a write error on the data recording medium and in which a part of a predetermined first block to be written on the data recording medium is associated and recorded with validity information indicating that a part of the first block is invalid, on the area other than the error area; a second data separator area that is contiguous to the first data area and in which the data rewriting information is recorded; and a second data area that is contiguous to the second data separator area and in which the first block is associated and recorded with validity information indicating that the first block is valid.

The data recording medium described above, further comprises a first data area containing data written as a result of changing the write-area of the first block to cause the first block, excluding the validity information, to be written in the error area when the validity information of a second block to be written after the first block is written in the error area; and the second data area contains the first block rewritten due to a write error generated as a result of changing the write-area of the first block.

The data recording medium described above further comprises a first data area containing data including a duplication of at least a part of data to be written as the first block.

The summary of the invention provided above does not enumerate all the required features of the present invention and sub-combinations of the features fall in the scope of the present invention.

BRIEF DESCRIPTION OF THE DRAWINGS

FIG. 4(a) shows an example in which a write error has been generated by the tape storage apparatus;

FIG. 4(b) shows an example in which another write error occurred after the write position in block N+I is changed by the tape storage apparatus;

FIG. 4(c) shows an example in which a write-area is changed by the tape storage apparatus;

DETAILED DESCRIPTION OF A PREFERRED EMBODIMENT

The present invention will be described below with respect to embodiments of the present invention. However, the embodiments described below do not limit the present invention which is defined in the claims and not all combinations of the features described in the embodiments are essential to the present invention.

Figure 1:
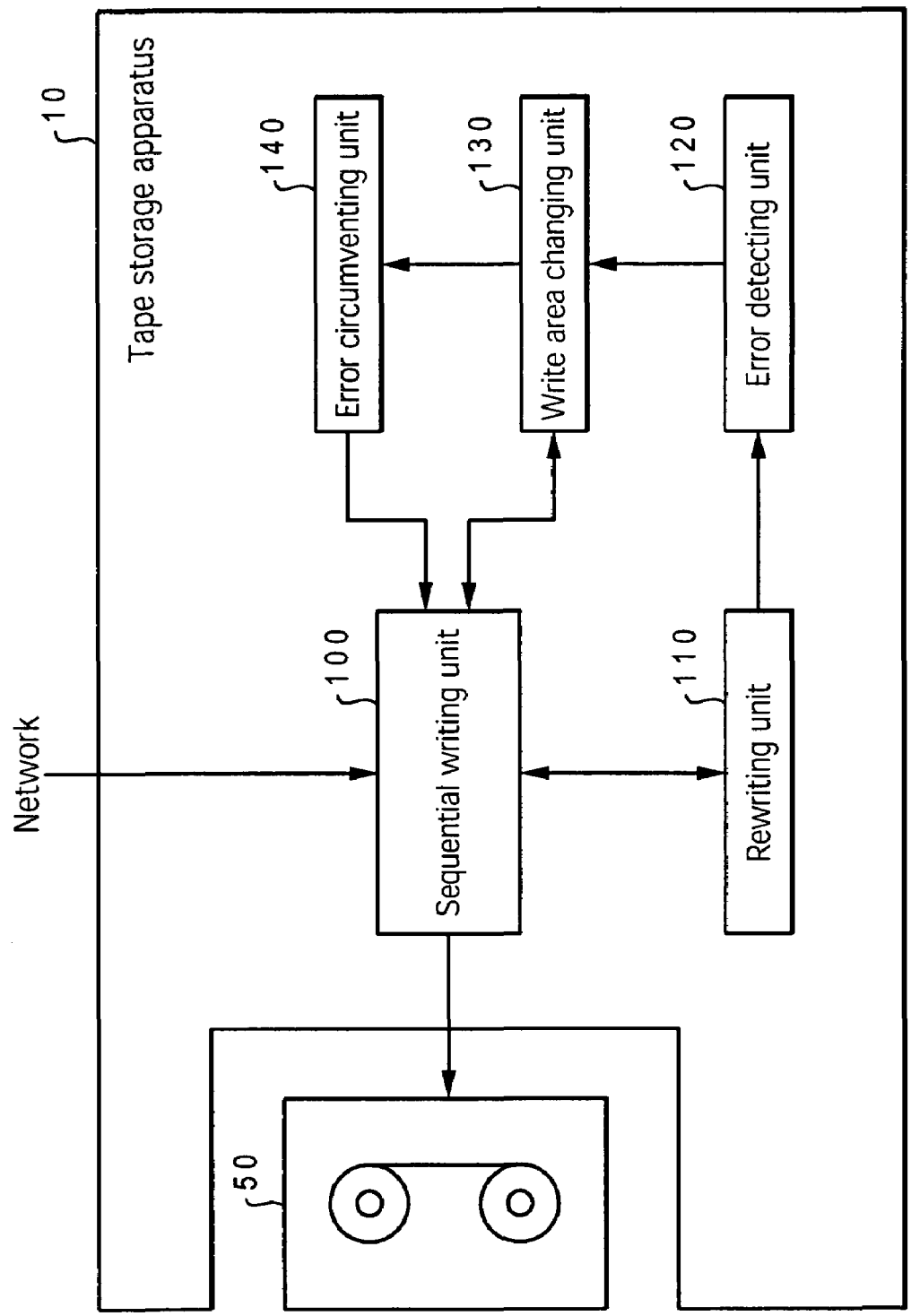
FIG. 1 shows a functional block diagram of a tape storage apparatus.

FIG. 1 shows a functional block diagram of a tape storage apparatus 10. The tape storage apparatus 10 is a tape drive device, which is one example of a memory apparatus according to the present invention. It may be an LTO-standard base apparatus, for example. The tape storage apparatus 10 sequentially writes a number of blocks generated by dividing data onto a tape recording medium 50, which is one example of a tape recording medium for recording data. If a write error occurs, the tape storage apparatus 10 changes the area in which the block preceding the block in which the write error occurred had been written so that the write error can be successfully circumvented and writing of remaining blocks can be continued.

The tape storage apparatus 10 includes a sequential writing unit 100, a rewriting unit 110, an error detecting unit 120, a write-area changing unit 130, and an error circumventing unit 140. The sequential writing unit 100 obtains each of blocks to be written onto the tape recording medium 50 from an external source such as an external network, associates it with validity information indicating that the data contained in that block is valid, and sequentially writes the blocks and validity information on the tape recording medium 50. The sequentially writing unit 100 also rewrites a block according to an instruction from the rewriting unit 110, writing area changing unit 130, and error circumventing unit 140. The tape storage apparatus 10 sends result information indicating the result of writing a block, such as error information indicting whether an error in writing has occurred, to the rewriting unit 110 and the writing area changing unit 130.

If the rewriting unit 110 determines from the error information received from the sequential writing unit 100 that validity information associated with a block is written in the error area on the tape recording medium 50 that causes a write error, the rewriting unit 110 causes the sequential writing unit 100 to rewrite that block (Append Write in the LTO standard, for example). The rewriting unit 110 may also write an extended data set separator (EDSS), which is an example of data rewrite information indicating that data has been rewritten. The rewriting unit 110 may insert the EDSS in a position where the sequential writing unit 100 should start writing that block, thereby changing the position at which to start writing the data and causing the sequential writing unit 100 to rewrite the block. Then, if the rewriting unit 110 determines from error information received from the sequential writing unit 100 that validity information associated with a block is written again in the error area, the rewriting unit 110 notifies the error detecting unit 120 as such.

The error detecting unit 120 receives the notification, detects that the validity information associated with the block has been written in the error area, and notifies the write-area changing unit 130 of this. Receiving this notification, the write-area changing unit 130 changes write-areas on the tape recording medium 50 so that data in an additional block, excluding validity information, that would be written before the block is written in the error area and the validity information associated with the additional block is written in areas different from the error area. For example, the write-area changing unit 130 directs the sequential writing unit 100 to rewrite the additional block in a different area than the area into which the sequential writing unit 100 has written it. Thus, the write-area changing unit 130 changes the write-areas.

The write-area changing unit 130 writes the additional data in areas that follow the error area. Thus, the write-area changing unit 130 can record that the additional block whose write position has been changed is invalid and write the additional block in areas that follow the error area. When the write-area changing unit 130 determines from result information received from the sequential writing unit 100 that the writing of the additional block has been completed, the write-area changing unit 130 notifies the error circumventing unit 140 of the completion. The error circumventing unit 140 receives this notification and rewrites the block in a write-area that follows the error area.

In this way, if validity information associated with a single block would be written in an error area, the tape storage apparatus 10 could not indicate whether the block is valid or not. Therefore, the tape storage apparatus 10 changes write-areas for an additional block written before the single block and writes data in the additional block, excluding its validity information, in the error area and then rewrites the single block in order to appropriately record whether or not each of the written blocks is valid.

Figure 2:
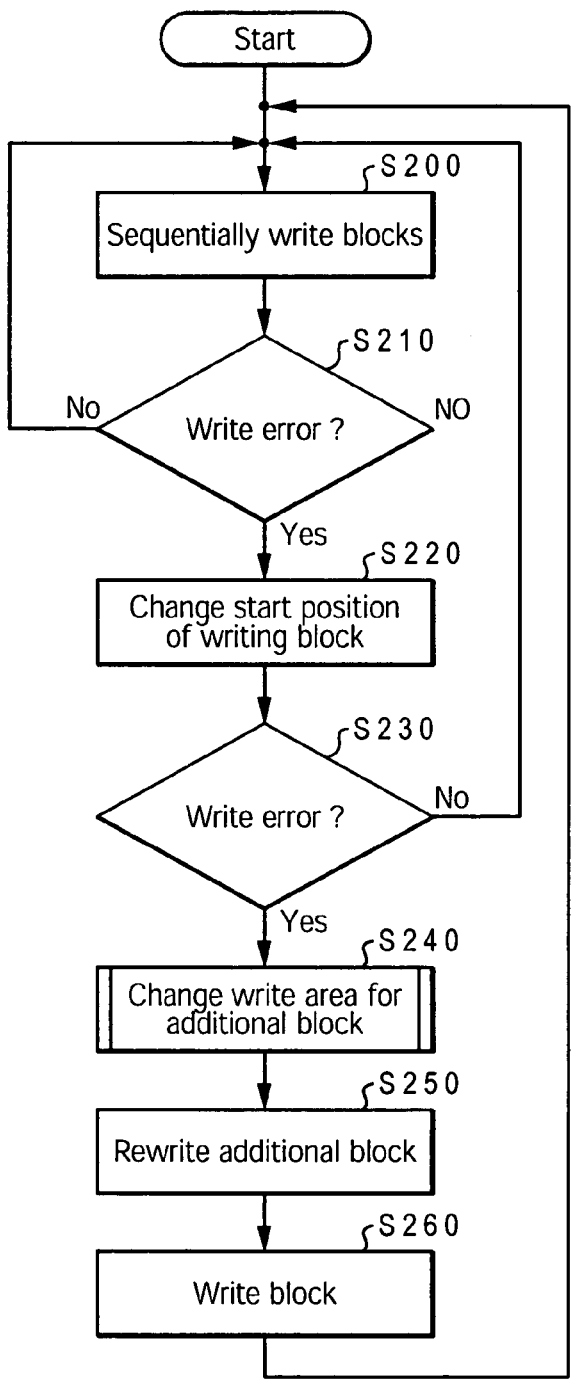
FIG. 2 shows a flowchart of a process performed in the tape storage apparatus.

FIG. 2 shows a flowchart of a process performed in the tape storage apparatus 10. The sequential writing unit 100 associates each of a number of blocks with validity information indicating whether or not the data contained in the block is valid and sequentially writes the blocks and validity information onto the tape recording medium 50 (S200). If no write error occurs (S210: NO), the sequential writing unit 100 repeats step S200 to continue writing blocks. On the other hand, if a write error occurs (S210: YES), then the rewriting unit 110 rewrites the single block in which the write error has occurred on the tape recording medium 50 (step S220). If no write error occurs in the writing of the single block (S230: NO), the tape storage apparatus 10 returns to step S200 and continues writing blocks.

On the other hand, if the rewriting unit 110 rewrites the single block on the tape recording medium 50 and rewrite validity information in the error area (S230: YES), then the error detecting unit 120 detects that the validity information has been written in the error area. In response to this, the write-area changing unit 130 changes a write-area on the tape recording medium 50 in which the additional block is to be written so that the additional block, excluding its validity information, that was written before the single block, is written in the error area and the validity information is written in areas other than the error area (S240).

Then, the write-area changing unit 130 rewrites the additional block in a write-area that follows the error area (S250) and then the error circumventing unit 140 writes the single block on the tape recording medium 50 (S260). Then the tape storage apparatus 10 returns to step S200 and continues writing blocks.

In FIG. 2, the rewriting unit 110 changes the position to start writing the block in which a write error has generated and rewrites the block on the tape recording medium 50 (S220, for example). Alternatively, the rewriting unit 110 may change the position at which to start writing the block once again. That is, the number of writing attempts by the rewriting unit 110 is not limited to one. The rewriting unit 110 may attempt a predetermined number of times.

While the error detecting unit 120 detects a write error of a block that has bee written by the sequential writing unit 100, the timing of write error detection is not limited to this example. For example, the error detecting unit 120 may determine whether or not an area in which validity information associated with a block is an error area before the block is written.

Figure 3:
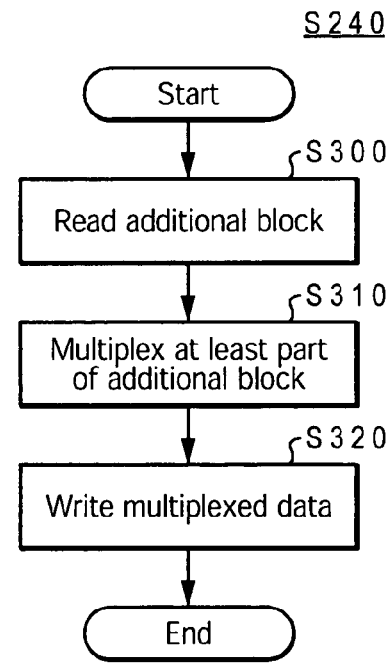
FIG. 3 shows a flowchart of a process performed at step S240 shown in FIG. 2.

FIG. 3 shows a flowchart of a process performed at step S240 in FIG. 2. After a write-error occurs in a block, the write-area changing unit 130 reads an additional block that has been written before the block in which the write error occurred (S300). The write-area changing unit 130 multiplexes at least part of the additional block (S310). The write-area changing unit 130 then writes the multiplexed or partially multiplexed additional block onto the tape recording medium S0. Thus, at least a part of the additional block that has been written by the rewriting unit 110 is redundantly written on the tape recording medium SO (S320).

In this way, the write-area changing unit 130 writes a block that includes a data of the additional block and is larger in size than the additional block, in place and as the equivalent of the additional block written by the sequential writing unit 100. Thus, the write-area changing unit 130 extends the write-area of the additional block to the area in which the single block was written so that the data in the additional block, excluding its validity information, can be written in the error area. Consequently, the tape recording medium 10 can properly record that the additional block is invalid and can properly write a block to be written after the additional block into the area following the error area. In other words, the tape storage apparatus 10 can properly record the validity information associated with the single block and the additional block in the tape recording medium 50.

FIG. 4(*a*) shows an example in which a write error has been generated by the tape storage apparatus 10. The sequential writing unit 100 sequentially writes on the tape recording medium 50 block N−2, block N−1, block N, which is an example of an additional block according to the present invention, and block N+I, which is recorded contiguous by after block N and is an example of a single block according to the present invention. During writing of block N+I by the sequential writing unit 100, the rewriting unit 110 detects that the validity information associated with block N+I is written in an error area in which a write error occurs in the tape recording medium 50.

Block N+I is recorded contiguously after block N. "Contiguously" herein means that blocks are physically contiguous to each other on the tape recording medium 50 or blocks are contiguously read in a predetermined manner. For example, block N+I may be recorded contiguous to the data set separator (DSS) that indicates the block boundary between block N+I and block N on the tape recording medium SO.

FIG. 4(*b*) indicates an example in which another write error occurs after the position in which block N+I is written is changed by the tape storage apparatus 10. If a write error occurs as shown in FIG. 4(*a*), the rewriting unit 110 rewrites block N+I on the tape recording medium 50. For example, the rewriting unit 110 may write an extended data set separator, which is an example of data rewrite information indicating that data was rewritten after an error had occurred in writing a block, as shown in FIG. 4(*b*), to Change the starting position at which block N+I is to be written. If the validity information associated with block N+I is written in the error area again after the rewriting unit 110 changed the position at which to start writing block N+I, the error detecting unit 120 notifies the write-area changing unit 130 of this and causes the write-area changing unit 130 to change the area in which block N is to be written.

Validity information associated with each of the plurality of blocks may be information written in a storage area having a predetermined length, for example substantially 6 CQ (Code Quads) from the beginning of the block. Because a write error has occurred while a predetermined length of block N+I was being written from its beginning, the rewriting unit 110 and the error detecting unit 120 determine that the validity information associated with block N+I has been written in the error area. The validity information may be information indicating the size of data to be recorded in a block, for example, In that case, the device that reads data from the tape recording medium 50 may determine whether or not the size of data to be recorded in the block differs from the actual size of the block to determine whether or not the block is valid.

In another example, the tape storage apparatus 10 reads a predetermined length of data from its beginning and conducts thorough analysis of the predetermined length of data to determine whether or not the read block is valid. Validity information need not be recorded data explicitly indicating whether a block is valid. It may be any information from which the tape storage apparatus 10 can determine whether or not each block is valid.

FIG. 4(*c*) shows an example in which the write-area is changed by the tape storage apparatus 10. The write-area changing unit 130 writes, an EDSS, which is an example of data rewrite information, on the tape recording medium 50, in place of block N written by the rewriting unit 110. Then the write-area changing unit 130 writes block N', which includes the data in block N and is larger in size than block N, in the area following the EDSS, in place of block N written by the rewriting unit 110 and thereby changes the area in which block N is to be written. In this way, the write-area changing unit 130 changes the write-areas of block N so that data in block N', excluding its validity information, is written in the error area and the validity information of block N' is written in an area other than the error area. The write-area changing unit 130 then writes an EDSS that indicates that block N is rewritten on the tape recording medium 50 and then rewrite block N'. The error circumventing unit 140 writes block N+I in which the sequential writing unit 100 has made a write error.

As a result, the tape recording medium 50 includes a first data separator area in which an EDSS, which is an example of data rewrite information, is recorded, a first data area which is contiguous to the first data separator area and includes an error area, a second data separator area which is contiguous to the first data area and in which an EDSS, which is an example of data rewrite information, is recorded, and a second data area which is contiguous to the second data separator area and in which block N' and validity information associated with it for indicating whether block N' is valid or not.

A predetermined part of block N' that is to be written on the tape recording medium 50 is associated with validity information indicating whether block N' is valid or not, and is recorded in an area, other than the error area, in the first data area.

Figure 5B:
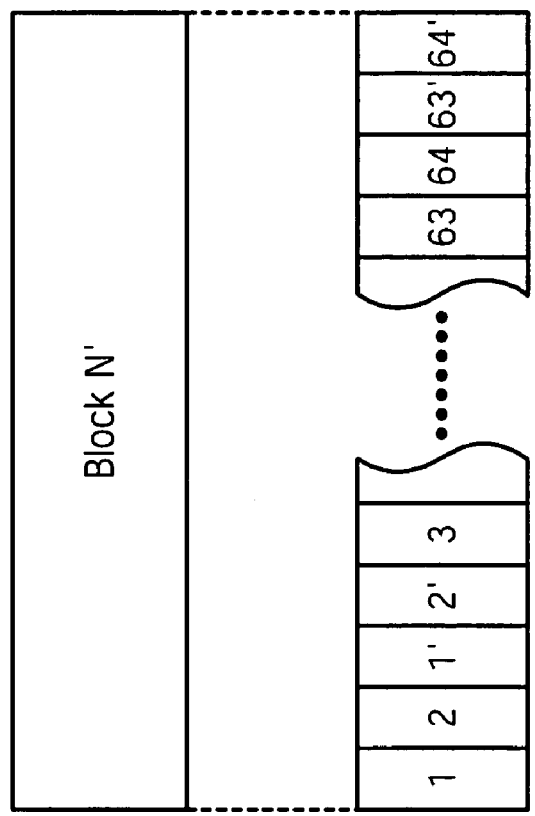
FIG. 5(b) shows details of block N'.
Figure 5A:
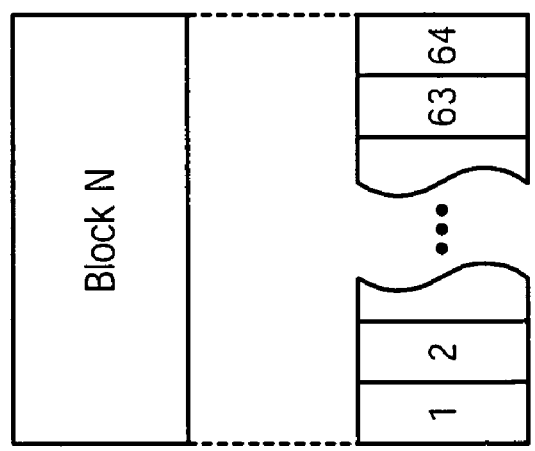
FIG. 5(a) shows details of block N.

FIG. 5(a) shows details of block N. FIG. 5(b) shows details of block N'. The sequential writing unit 100 write 1st to 64th data, for example, one by one on the tape recording medium 50. The write-area changing unit 130 duplicates and writes at least a part of data contained in block N and thus writes block N' larger than block N. In the example shown in FIG. 5, the write-area changing unit 130 writes items of data included in block N twice and thereby changes the write-area in which block N is written. As a result, the first data area contains block N', which includes duplications of a part of data to be written as block N.

Figure 6:
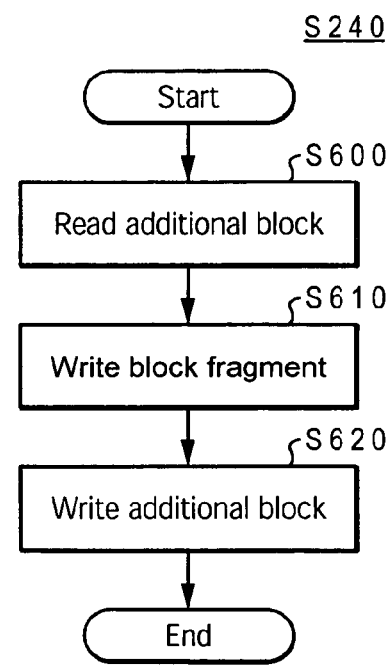
FIG. 6 shows a flowchart of a process performed at S240 according to an alternative embodiment.

FIG. 6 shows a flowchart of a process performed at step S240 in an alternative embodiment. The components of a tape storage apparatus 10 according to the alternative embodiment are substantially the same as those of the tape storage apparatus 10 described with respect to FIGS. 1 to 5. The tape storage apparatus 10 according to the alternative embodiment differs from the one described with respect to FIGS. 1 to 5 in the operation performed at step S240. A write-area changing unit 130 reads data contained in an additional block written by a rewriting unit 110 from the tape recording medium 50 (S600).

The write-area changing unit 130 then writes a block fragment which is a part of the additional block in an area in which the additional block is to be written by a rewriting unit 110 (S610). Then the write-area changing unit 130 writes the additional block again (S620). In this way, the write-area changing unit 130 can change the write-areas so that the part of the additional block rewritten at step S620, excluding its validity information, is written in an error area.

Figure 7A:
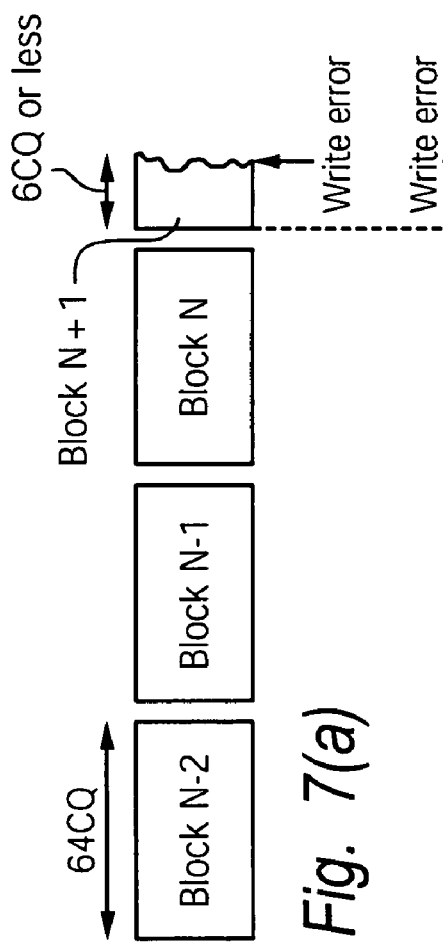
FIG. 7(a) shows an example in which a write error has been generated by a tape storage apparatus according to the alternative embodiment.
Figure 7B:
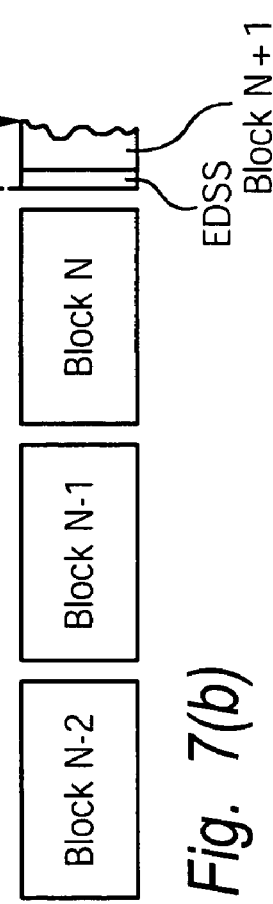
FIG. 7(b) shows an example in which another write error occurred after the write and position in block N+I was changed by the tape storage apparatus in the alternative embodiment.
Figure 7C:
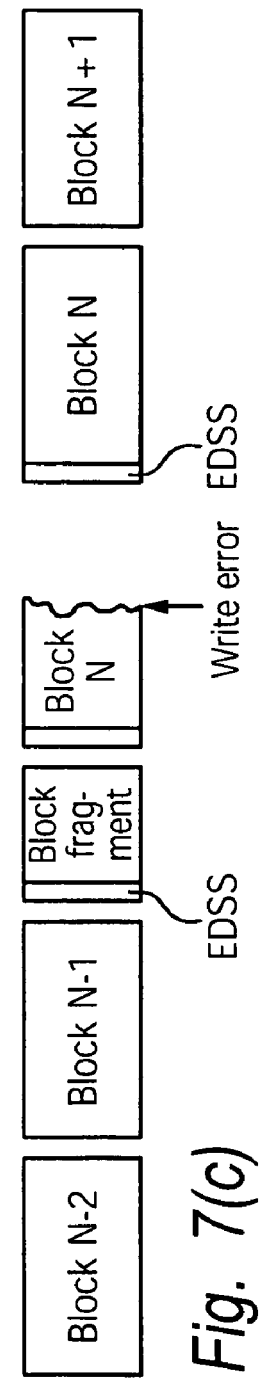
FIG. 7(c) shows an example in which the write-area is changed by the tape storage apparatus in the alternative embodiment.

FIG. 7(a) shows an example in which a write error has been generated by the tape storage apparatus 10 of the alternative embodiment. FIG. 7(b) shows an example in which another write error has occurred after the write position of block N+I was changed by the tape storage apparatus 10 of the alternative embodiment. FIG. 7(c) shows an example in which a write-area is changed by the tape storage apparatus 10 according to the alternative embodiment. FIGS. 7(a) and 7(b) are substantially the same as FIGS. 4(a) and 4(b), respectively, and therefore the description thereof will be omitted.

The write-area changing unit 130 writes a block fragment, which is a part of block N along with an EDSS in the area in which block N was written by the rewriting unit 110. The write-area changing unit 130 then writes block N again. Thus, the write-area changing unit 130 can change the write-area of block N so that part of block N rewritten, excluding validity information, is written in the error area.

Then, the write-area changing unit 130 rewrites block N in the area that follows the error area and the error circumventing writing unit 140 writes block N+I in which a write error has occurred in FIG. 7(a). Each of blocks contains a data recency indicator (such as WP: writePass information in the LTO standard), which indicates recency of data to be written with respect to data that has been already written. The error detecting unit 120 preferably associates data recency higher than that of a block fragment to be written on the tape recording medium 50 with block N to be written in an area that follows the error area. Thus, the tape storage apparatus 10 can record that the data contained in block N that follows the error area is newer than the data contained in the block fragment.

As has been described, according to the alternative embodiment, the tape storage apparatus 10 can properly record validity information that indicates whether each of the plurality of blocks is valid. Furthermore, according to the alternative embodiment, a write error can be circumvented and writing of blocks can be continued even if data in a block is not allowed to be redundantly written under the specifications for the recording medium 50.

A block fragment in this embodiment is a block containing a portion of data contained in block N. Alternatively, a block fragment may be data that does not relate to block N. In other words, a block fragment may be write-area adjusting data that is written on the tape recording medium 50 before block N is written so that block N, excluding its validity information, is written in an error area.

Figure 8:
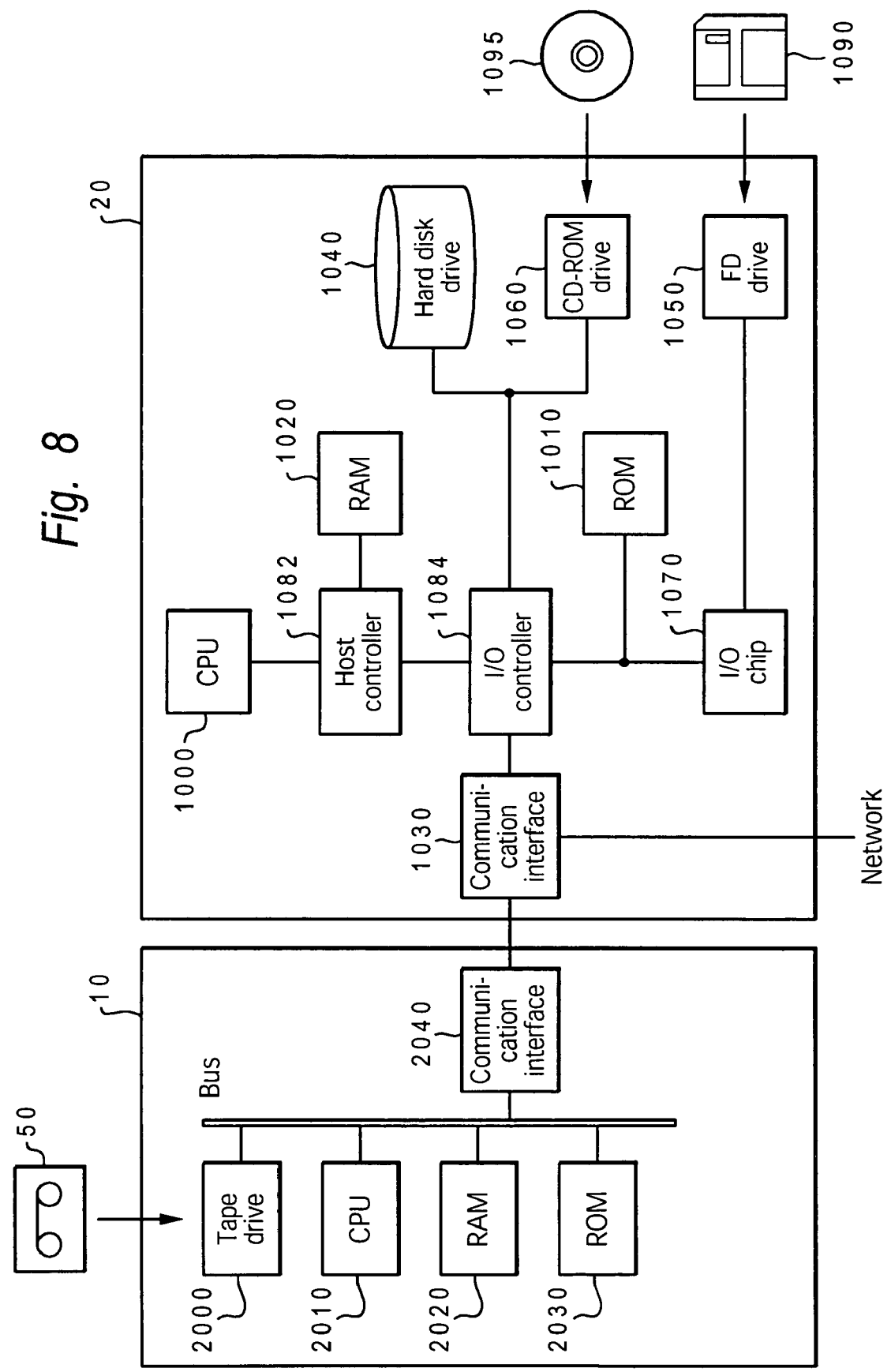
FIG. 8 shows an exemplary hardware configuration of the tape storage apparatus in the embodiment or the alternative embodiment.

FIG. 8 shows an example of hardware configuration of a tape storage apparatus 10 according to the embodiment or the alternative embodiment. The tape storage apparatus 10 includes a tape drive 2000, a CPU 2010, a RAM 2020, a ROM 2030, and a communication interface 2040, which are interconnected through a bus.

The tape drive 2000 reads a program or data from a tape recording medium 50, which is an example of a program recording medium or data recording medium, and provides it to the ROM 2030. The ROM 2030 stores a boot program to be executed by the CPU 10000 on activation of the tape storage apparatus 10 and a program for causing the tape storage apparatus 10 to function after the activation. The CPU 2010 executes the programs through the use of the RAM 2020.

The program to be provided to the tape storage apparatus 10 is read from the tape recording medium 50 by the tape drive 2000 and installed in the tape storage apparatus 10. Alternatively, the communication interface 2040 may obtain the program from an information processing unit 20 through an input-output device such as a serial port or over a network and install it in the tape storage apparatus 10.

The information processing unit 20 includes a CPU section including a CPU 10000 and a RAM 1020 which are connected to each other by a host controller 1082, an input-output section including a communication interface 1030, a hard disk drive 1040, and a CD-ROM drive 1060, which are connected to the host controller 1082 thorough an input-output controller 1084, and a legacy input-output section including a ROM 1010, a flexible disk drive 1050, and an input-output chip 1070 which are connected to the input-output controller 1084.

The host controller 1082 connects the RAM 1020 with the CPU 10000, which accesses the RAM 1020 at a high transfer rate. The CPU 10000 operates according to programs stored in the ROM 1010 and the RAM 1020 to control each of the components.

The input-output controller 1084 connects the host controller 1082 with the communication interface 1030, hard disk drive 1040, and CD-ROM drive 1060, which are relatively fast input-output devices. The communication interface 1030 provides communication with the tape storage apparatus 10 and other devices over a network. The hard disk drive 1040 stores programs and data used by the tape storage apparatus 10. The CD-ROM drive 1060 reads a program or data from a CD-ROM 1095 and provides it to the tape storage apparatus 10 through the communication interface 1030.

Connected to the input-output controller 1084 are the ROM 1010 and relatively slow input-output devices such as the flexible disk drive 1050 and input-output chip 1070. The ROM 1010 stores a boot program executed by the CPU 10000 on activation of the tape storage apparatus 10 and programs which are dependent on the hardware of the tape storage apparatus 10. The flexible disk drive 1050 reads a program or data from a flexible disk 1090 and provides it to the input-output chip 1070 through the RAM 1020. Connected to the input-output chip 1070 are the flexible disk 1090, and input and output devices through a parallel port, serial port, keyboard port, mouse port, and the like.

A program to be provided to the tape storage apparatus 10 is stored in a program recording medium such as a flexible disk 1090, a CD-ROM 1095, or an IC card and provided by a user to the tape storage apparatus 10. The program is read from the program recording medium, installed in the tape storage apparatus 10 through the communication interface 1030, and executed in the tape storage apparatus 10.

The program installed and executed in the tape storage apparatus 10 includes a sequential writing module, a rewriting module, an error detecting module, a write-area changing module, and an error circumventing module. Each module causes the tape storage apparatus 10 to perform operations, which are the same as those performed by their corresponding units in the tape recording apparatus 10 that have been described with respect to FIGS. 1 to 7. The description of the operations will therefore be omitted.

The program or modules mentioned above may be stored in an external storage medium. The storage medium may be an optical recording medium such as a DVD and PD, a magneto-optical recording medium such as an MD, a tape medium, or a semiconductor memory such as an IC card, as well as a flexible disk 1090 and a CD-ROM 1095. Alternatively, a storage device such as a hard disk or a RAM provided in a server system connected to a private communication network or the Internet is used as a program recording medium and the program may be provided from the program recording medium to the tape storage apparatus 10.

As has been described, if the tape storage apparatus 10 writes validity information associated with a single block by writing the block, the tape storage apparatus 10 changes the write-area for an additional information written before the single block and writes the additional block, excluding its validity information, in the error area. Then, the tape storage apparatus 10 sequentially rewrites the additional block and the single block. Thus, it can properly record whether or not each of the written block is valid.

While the present invention has been described with respect to embodiments of the present invention, the technical scope of the present invention is not limited to the scope described with respect to the embodiments. Various modification or improvements can be made to the embodiments described above. For example, the plurality of blocks may be written in a randomly accessible medium such as magnetic disk, instead of a medium such as a tape recording medium 50 on which data is sequentially written. It will be apparent from the claims that variations including such modification or improvements are also fall within the technical scope of the present invention.

What is claimed is:

1. A storage apparatus for sequentially writing a plurality of blocks of data on a data recording medium, said storage apparatus comprising:
    a sequential writing unit for sequentially writing on a data recording medium a plurality of blocks of data including a single block and an additional block written to a first write-area of said data recording medium before said single block is written, each of said plurality of blocks comprising data and validity information indicating whether or not data contained in that block is valid;
    an error detecting unit for detecting when said writing of said single block by said sequential writing unit causes said validity information of said single block to be written in an error area and for generating a write-error signal in response to said detecting;
    a write-area changing unit for changing a location on said data recording medium of data from said additional block, wherein said write-area changing unit writes said data of said additional block, excluding said validity information of said additional block, to said error area and writes said validity information of said additional block to an area of said data recording medium other than said error area; and
    an error-circumventing unit for writing said single block in a second write-area on said data recording medium, said second write-area following said error area.

2. The storage apparatus of claim 1, wherein said write-area changing unit includes means for changing the write-area of said additional block by rewriting said additional block as a reformatted block, said reformatted block including data in said additional block and a duplicated part of said data contained in said additional block, in substitution for said additional block initially written by said sequential writing unit.

3. The storage apparatus of claim 1, wherein:
    said error detecting unit further comprises means for detecting whether validity information of said single block is written in a storage area having a predetermined displacement from said single block;
    said error detecting unit further comprises means for detecting that said validity information of said single block is written in said error area in response to detecting a write error within said storage area; and
    said write-area changing unit further comprises means for changing said write-area of said additional block to selectively prevent a first pan of said additional block from being written within said storage area and to selectively cause a second part of said additional block that follows said first part to be written in said error area.

4. The storage apparatus of claim 1, wherein said error detecting unit further comprises means for detecting that said validity information of said single block that is to be recorded contiguously to said additional block is written in said error area; and
    said write-area changing unit further comprises means for writing a block fragment that is a part of said additional block into an area in which said additional block is written by said sequential writing unit and for writing data, excluding said validity information, to said error area.

5. The storage apparatus of claim 4, wherein said single block further comprises a data recency indicator for indicating the recency of data to be newly written with respect to data already written.

6. The storage apparatus of claim 4, wherein said single block further comprises a data recency indicator for indicating the recency of data to be newly written with respect to data already written; and
said write-area changing unit includes means for writing a replacement data recency indicator to replace the data recency indicator of said block fragment written by said write-area changing unit with said additional block to be written in an area that follows said error area.

7. The storage apparatus of claim 1, wherein said write-area changing unit includes means for changing the write-area of said additional block by rewriting said additional block as a reformatted block, said reformatted block including data in said additional block, in substitution for said additional block initially written by said sequential writing unit.

8. A method of sequentially writing a plurality of blocks of data on a data recording medium, said method comprising:
sequentially writing a single block on a data recording medium, wherein said step of sequentially writing on a data recording medium further comprises creating a single block and an additional block written to a first write-area of said data recordin medium before said single block is written comprising data and validity information indicating whether or not data contained in that block is valid;
detecting when said sequential writing of said single block causes said validity information of said single block to be created in an error area;
in response to said detecting step, generating a write-error signal;
changing a location on said data recording medium of data from said additional block wherein said changing further comprises rewriting said data of said additional block, excluding said validity information of said additional block, to said error area and rewriting said validity information of said additional block to an area of said data recording medium other than said error area; and
storing said single block in a second write-area on said data recording medium, said second write-area following said error area.

9. The method of claim 8, wherein said changing step further comprises changing the write-area of said additional block by rewriting said additional block as a reformatted block, said reformatted block including data from said additional block and a duplicated part of said data from said additional block, in substitution for said additional block.

10. The method of claim 8, wherein:
said detecting step further comprises detecting whether validity information of said single block is stored in a storage area having a predetermined displacement from said single block;
in response to detecting a write error within said storage area, detecting whether said validity infonnation of said single block is written in said error area; and
changing said write-area of said additional block to selectively prevent a first part of said additional block from being written within said storage area and to selectively cause a second part of said additional block that follows said first part to be written in said error area.

11. The method of claim 8, wherein said detecting step further comprises detecting that said validity information of said single block is to be recorded contiguously to said additional block and in said error area; and
writing a block fragment into an area in which said additional block is written, excluding said validity information, to said error area.

12. The method of claim 8, wherein sequentially writing said single block further comprises writing a data recency indicator for indicating the recency of data to be newly written with respect to data already written.

13. The method of claim 8, wherein sequentially writing said single block further comprises writing a data recency indicator for indicating the recency of data to be newly written, wit respect to data already written; and
writing a replacement data recency indicator to replace the data recency indicator of said block fragment written by said write-area changing unit with said additional block to be written in an area that follows said error area.

14. The method of claim 8, wherein the step of changing the write-area of said additional block further comprises rewriting said additional block as a reformatted block, said reformatted block including data from said additional block.

15. A computer program product in a computer-readable medium for sequentially writing a plurality of blocks of data on a data recording medium, said computer program product comprising:
a computer-readable medium;
instructions on the computer-readable medium for sequentially writing on a data recording medium a single block and an additional block written to a first write-area of said data recording medium before said single block is written, each of said plurality of blocks comprising data and validity information indicating whether or not data contained in that block is valid;
instructions on the computer-readable medium for detecting when said writing of said single block causes said validity information of said single block to be written in an error area;
instructions on the computer-readable medium for, in response to said detection, generating a write-error signal;
instructions on the computer-readable medium for changing a location on said data recording medium of data from said additional block, wherein said changing instructions comprise instructions for rewriting said data of said additional block, excluding said validity information of said additional block, to said error area and instructions for rewriting said validity information of said additional block to an area of said data recording medium other than said error area; and
instructions on the computer-readable medium for writing said single block in a second write-area on said data recording medium, said second write-area following said error area.

16. The computer program product of claim 15, wherein said changing instructions further comprise instructions on the computer-readable medium for changing the location of said additional block by writing a reformatted block, said reformatted block including data in said additional block and a duplicated part of said data contained in said additional block, in substitution for said additional block.

17. The computer program product of claim 15, wherein said detecting instructions further comprise instructions on the computer-readable medium for detecting that said validity information of said singe block is to be recorded contiguously to said additional block and is to be written in said error area; and said instructions for writing said single block in said second write-area further comprise instructions on the computer-readable medium for writing a block fragment that is a part of said additional block into an area in which said additional block is written and writing data of said additional block contiguously to said block fragment.

18. The computer program product of claim 15, wherein said writing instructions further comprise instructions on the computer-readable medium for indicating the recency of data to be newly written with respect to data already written; and said writing instructions further comprise instructions on the computer-readable medium for writing a data recency indicator higher than the data recency indicator of a block fragment, with said additional block being written in an area that follows said error area.

19. The computer program product of claim 15, wherein said changing instructions further comprise instructions on the computer-readable medium for changing the write-area of said additional block by rewriting said additional block as a reformatted block, said refbrniatted block including data in said additional block, in substitution for said additional block initially written by said sequential writing unit.

* * * * *